United States Patent
Chun

(10) Patent No.: US 12,177,762 B2
(45) Date of Patent: Dec. 24, 2024

(54) METHOD FOR ACCESSING NPN IN 5G MOBILE COMMUNICATION SYSTEM, AND USER EQUIPMENT

(71) Applicant: LG Electronics Inc., Seoul (KR)

(72) Inventor: Sungduck Chun, Seoul (KR)

(73) Assignee: LG Electronics Inc., Seoul (KR)

(*) Notice: Subject to any disclaimer, the term of this patent is extended or adjusted under 35 U.S.C. 154(b) by 369 days.

(21) Appl. No.: 17/616,852

(22) PCT Filed: Jun. 8, 2020

(86) PCT No.: PCT/KR2020/007384
§ 371 (c)(1),
(2) Date: Dec. 6, 2021

(87) PCT Pub. No.: WO2020/251226
PCT Pub. Date: Dec. 17, 2020

(65) Prior Publication Data
US 2022/0312296 A1    Sep. 29, 2022

(30) Foreign Application Priority Data
Jun. 10, 2019 (KR) .......................... 10-2019-0068250

(51) Int. Cl.
*H04W 48/02* (2009.01)
*H04W 48/16* (2009.01)
(Continued)

(52) U.S. Cl.
CPC ........... *H04W 48/02* (2013.01); *H04W 48/16* (2013.01); *H04W 48/18* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 6,826,414 B1* | 11/2004 | Reynolds | H04W 48/02 455/435.2 |
| 2008/0227447 A1* | 9/2008 | Jeong | H04W 36/0061 455/67.11 |
| 2018/0262978 A1 | 9/2018 | Kahn et al. | |

FOREIGN PATENT DOCUMENTS

CN        107040975       8/2017

OTHER PUBLICATIONS

3GPP, "3rd Generation Partnership Project; Technical Specification Group Services and System Aspects; System Architecture for the 5G System; Stage 2 (Release 16)," TS 23.501 V16.0.2, Apr. 2019, 316 pages.

(Continued)

*Primary Examiner* — Frantz Bataille
(74) *Attorney, Agent, or Firm* — Fish & Richardson P.C.

(57) ABSTRACT

One disclosure of the present specification provides a method for a user equipment (UE) to access a non-public network (NPN). The method may comprise: a step for selecting a first public land mobile network (PLMN); a step for, when the UE is configured to use the NPN, determining whether the NPN is available in a first cell of the first PLMN on the basis of NPN-related configuration information; a step for, when it is determined that the NPN is available in the first cell of the first PLMN, attempting to access the first cell in the first PLMN; and a step for, when it is determined that the NPN is not available in the first cell of the first PLMN, not attempting to access the first cell in the first PLMN.

10 Claims, 20 Drawing Sheets

(51) Int. Cl.
*H04W 48/18* (2009.01)
*H04W 84/04* (2009.01)

(56) References Cited

OTHER PUBLICATIONS

LG Electronics, "Clarification on PLMN selection for non public network," S1-190017 (revision of S1-19xxxx), Presented at 3GPP TSG-SA WG1 Meeting #85, Tallinn, Estonia, Feb. 18-22, 2019, 9 pages.
MediaTek Inc., "Considerations on emergency services and limited service state for NPN," S2-1905213 (revision of S2-19nnnn), Presented at SA WG2 Meeting #133, May 13-17, 2019, Reno, NV, USA, 5 pages.

* cited by examiner

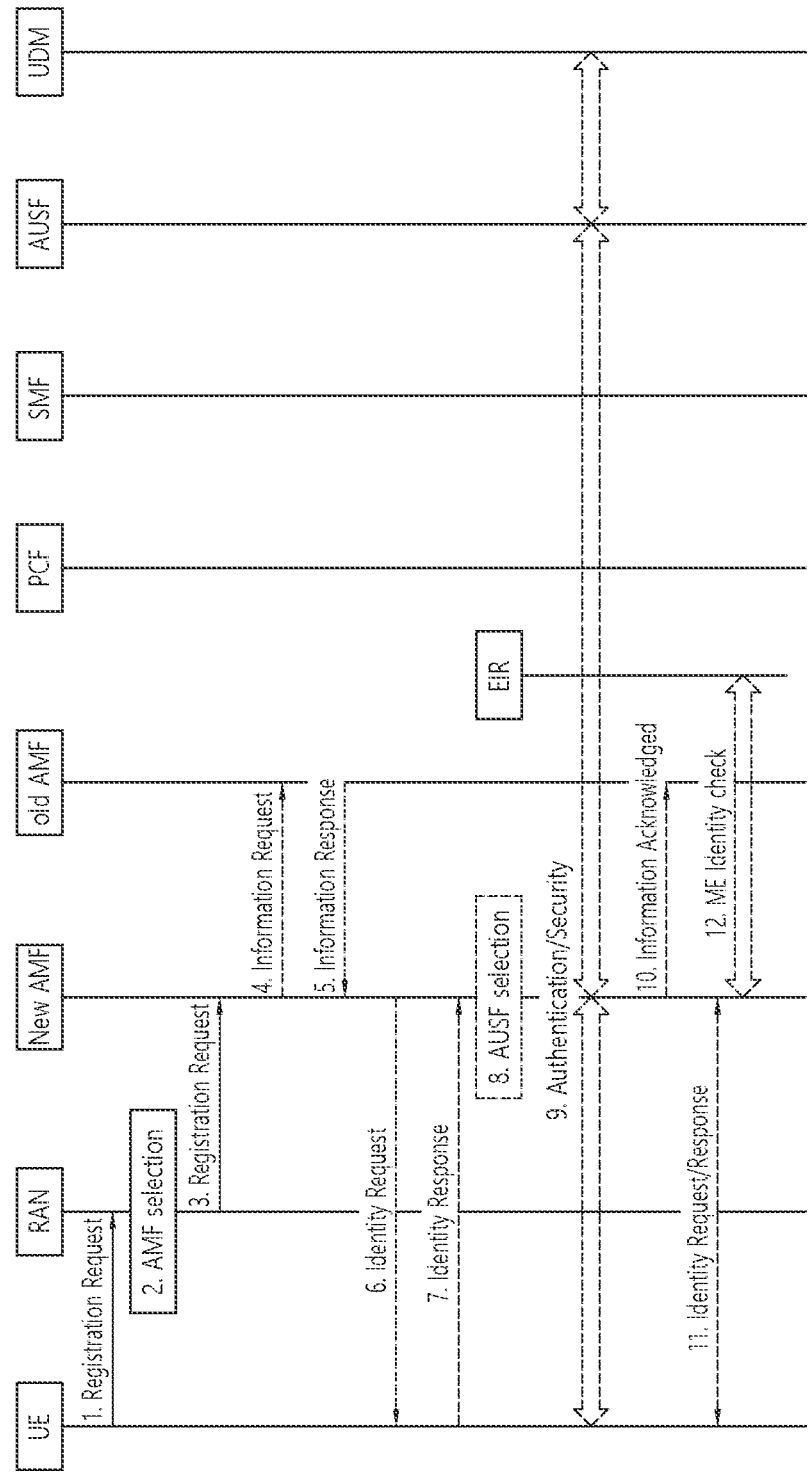

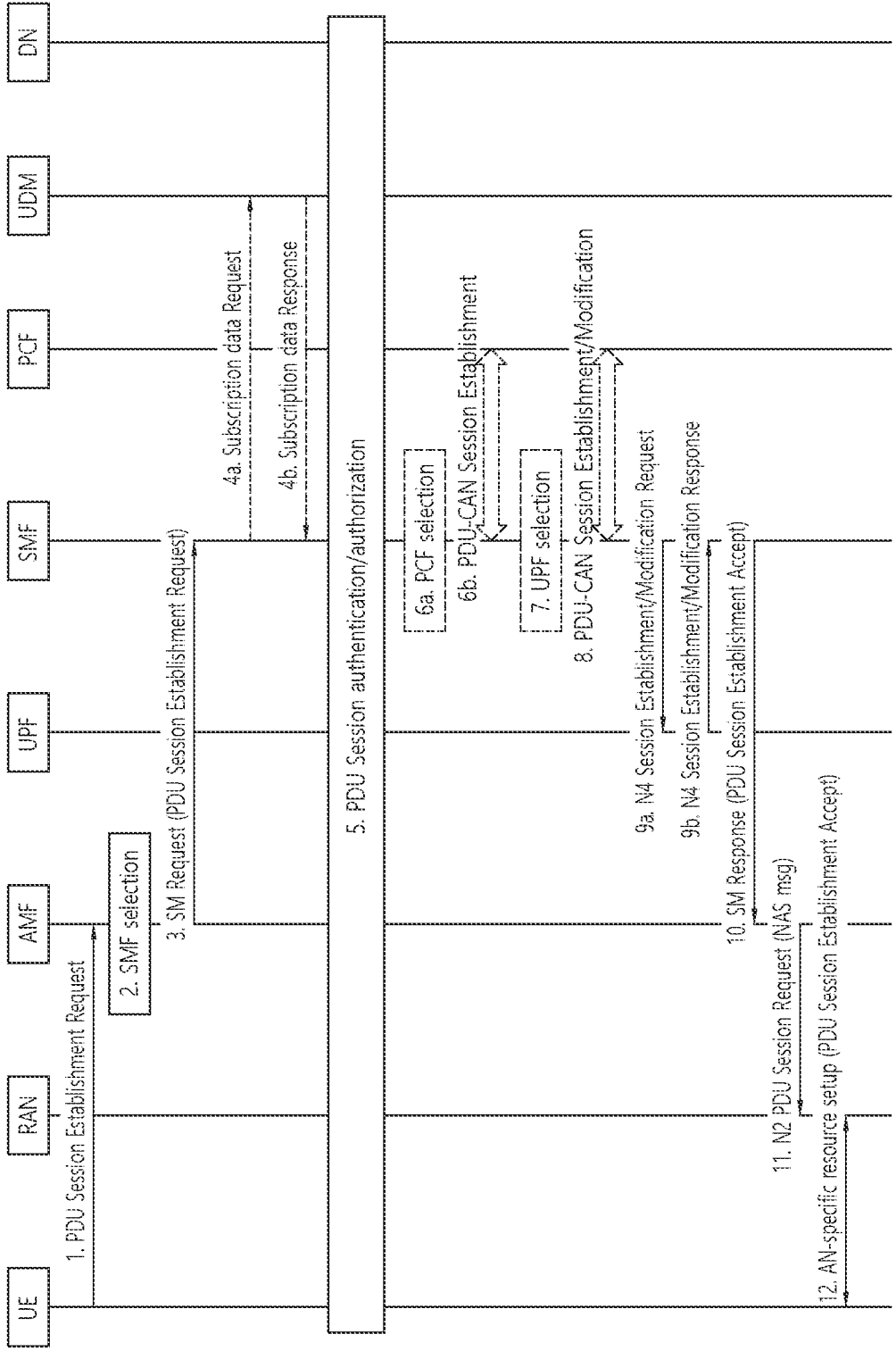

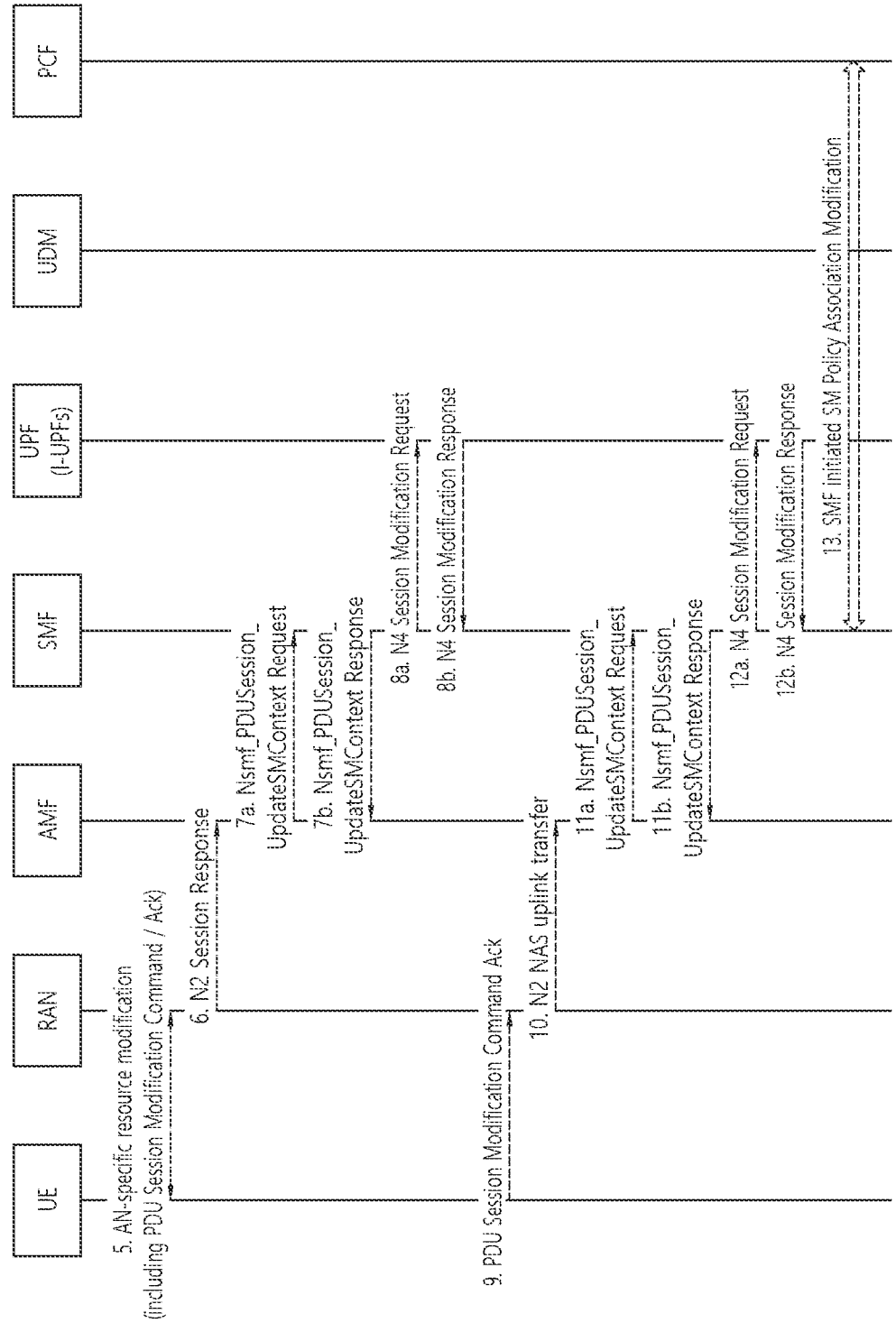

METHOD FOR ACCESSING NPN IN 5G MOBILE COMMUNICATION SYSTEM, AND USER EQUIPMENT

CROSS-REFERENCE TO RELATED APPLICATIONS

This application is a National Stage application under 35 U.S.C. § 371 of International Application No. PCT/KR2020/007384, filed on Jun. 8, 2020, which claims the benefit of Korean Patent Application No. 10-2019-0068250, filed on Jun. 10, 2019. The disclosures of the prior applications are incorporated by reference in their entirety.

TECHNICAL FIELD

The present specification relates to mobile communications.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

Meanwhile, in the next-generation mobile communication network, a Non-Public Network (NPN) may be built. An NPN is a private network that cannot be accessed by normal UEs.

However, if this is not implemented properly, a security problem may occur, such as a UE that is not allowed access to the NPN.

SUMMARY

Accordingly, an object of the present specification is to propose a method for solving the above-described problems.

In order to solve the above-described problems, a disclosure of the present specification provides a method for accessing a Non-Public Network (NPN) by a User Equipment (UE). The method may include selecting a first Public Land Mobile Network (PLMN); based on the UE being configured to use an NPN, determining whether the NPN is available in a first cell of the first PLMN based on NPN-related configuration information; in case that it is determined that the NPN is available in the first cell of the first PLMN, attempting access to the first cell in the first PLMN; and in case that it is determined that the NPN is unavailable in the first cell of the first PLMN, not attempting to access the first cell in the first PLMN.

In order to solve the above-described problems, a disclosure of the present specification provides a User Equipment (UE) for accessing a Non-Public Network (NPN). The UE may include at least one processor; at least one memory operably electrically connectable to the at least one processor and storing instructions. The instructions may, based on being executed by the at least one processor, perform operations comprising: selecting a first Public Land Mobile Network (PLMN); based on the UE being configured to use an NPN, determining whether the NPN is available in a first cell of the first PLMN based on NPN-related configuration information; in case that it is determined that the NPN is available in the first cell of the first PLMN, attempting access to the first cell in the first PLMN; and in case that it is determined that the NPN is unavailable in the first cell of the first PLMN, not attempting to access the first cell in the first PLMN.

In order to solve the above-described problems, a disclosure of the present specification provides a non-volatile computer readable storage medium storing instructions. The instructions may, based on being executed by at least one processor, cause the at least one processor to perform operations comprising: selecting a first Public Land Mobile Network (PLMN); based on the UE being configured to use an NPN, determining whether the NPN is available in a first cell of the first PLMN based on NPN-related configuration information; in case that it is determined that the NPN is available in the first cell of the first PLMN, attempting access to the first cell in the first PLMN; and in case that it is determined that the NPN is unavailable in the first cell of the first PLMN, not attempting to access the first cell in the first PLMN.

According to the disclosure of the present specification, it is possible to solve the problems of the prior art.

BRIEF DESCRIPTION OF THE DRAWINGS

FIGS. 5a and 5b are a signal flowchart illustrating an exemplary registration procedure.

FIGS. 6a and 6b are a signal flowchart illustrating an exemplary PDU session establishment procedure.

FIGS. 7a and 7b show a modification procedure for a PDU session.

DETAILED DESCRIPTION

Figure 1:
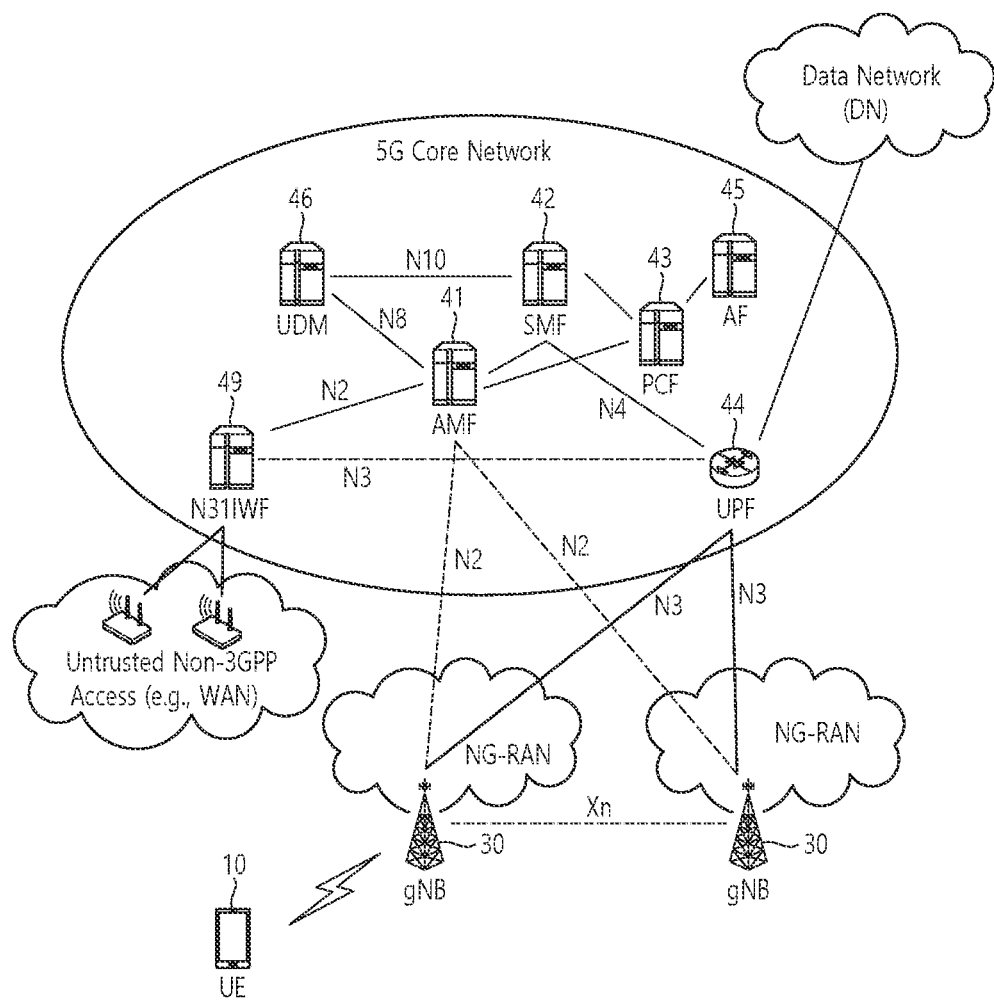
FIG. 1 is a structural diagram of a next-generation mobile communication network.
Figure 2:
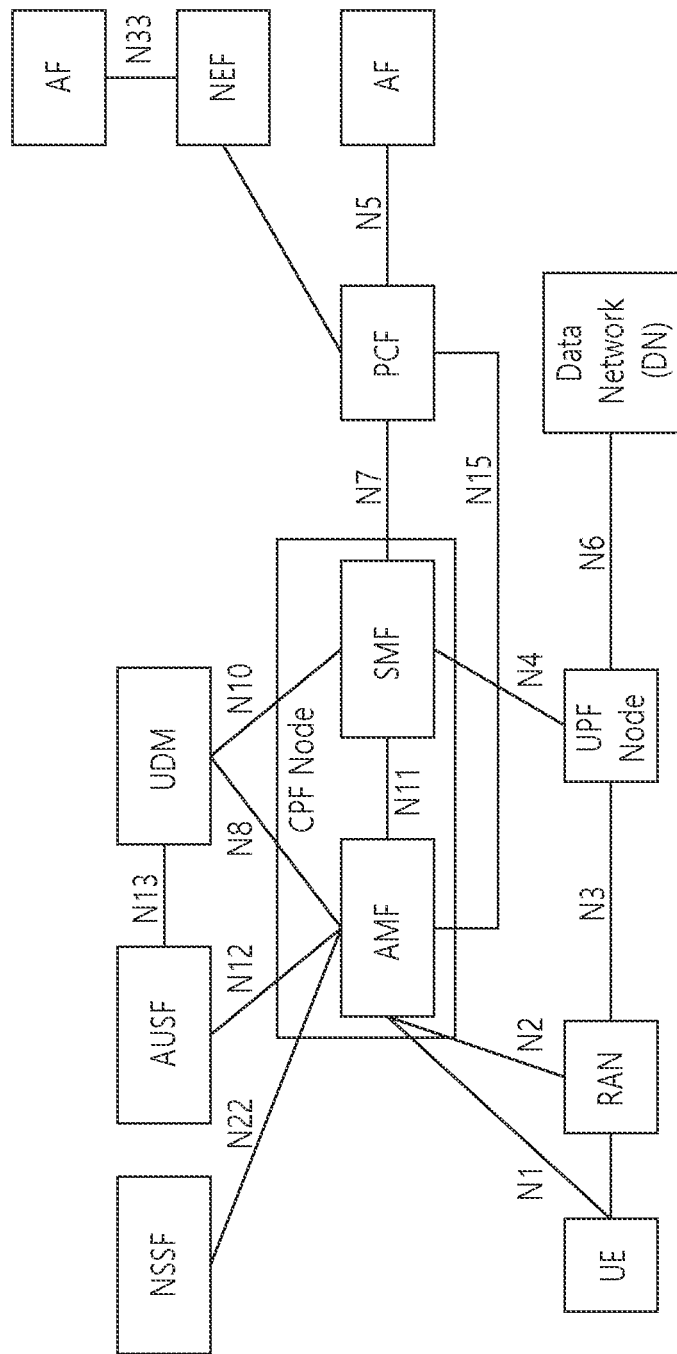
FIG. 2 is an exemplary diagram illustrating a predicted structure of a next generation mobile communication in terms of a node.
Figure 3:
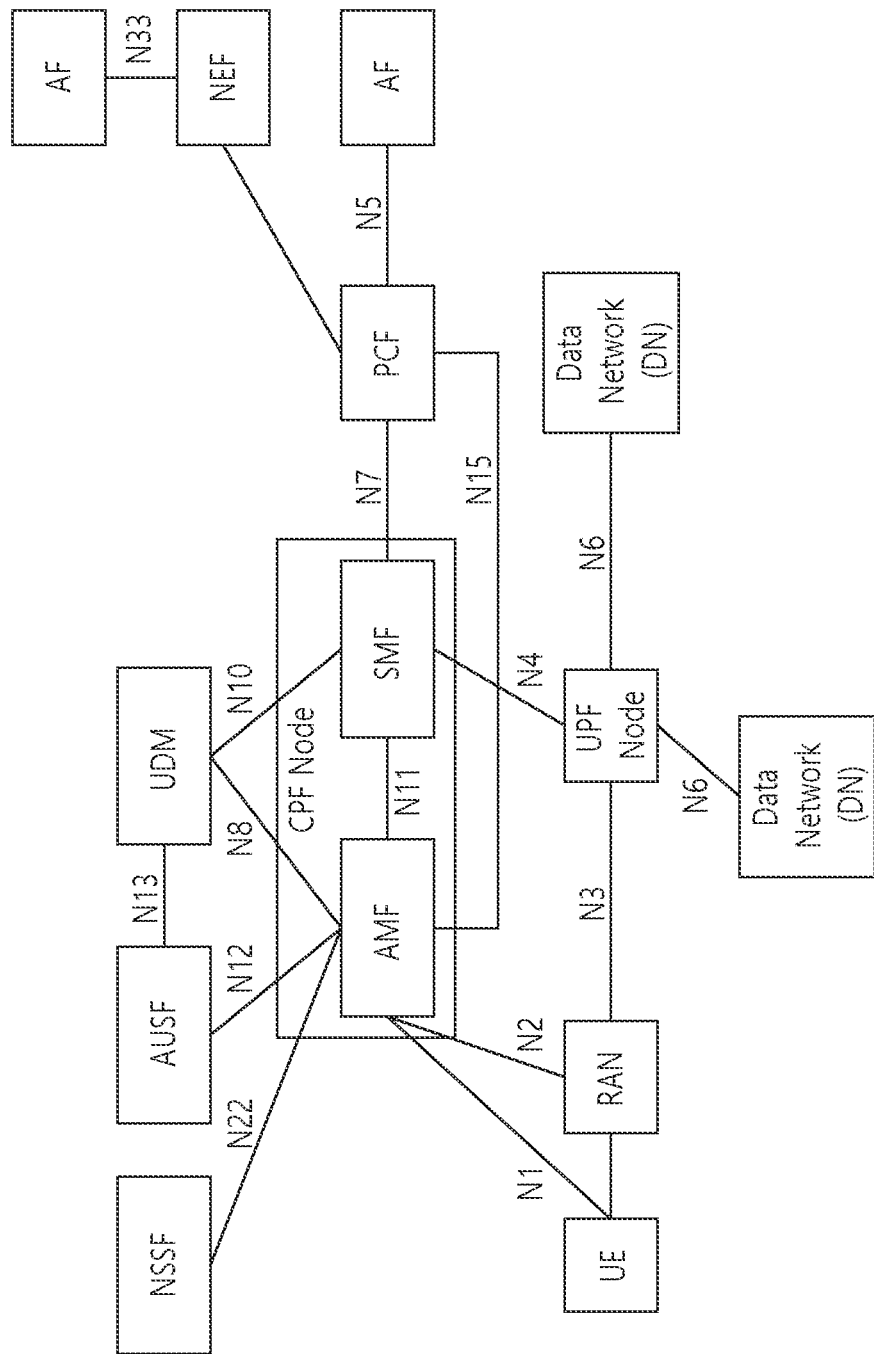
FIG. 3 is an exemplary diagram illustrating an architecture for supporting simultaneously access two data networks.
Figure 4:
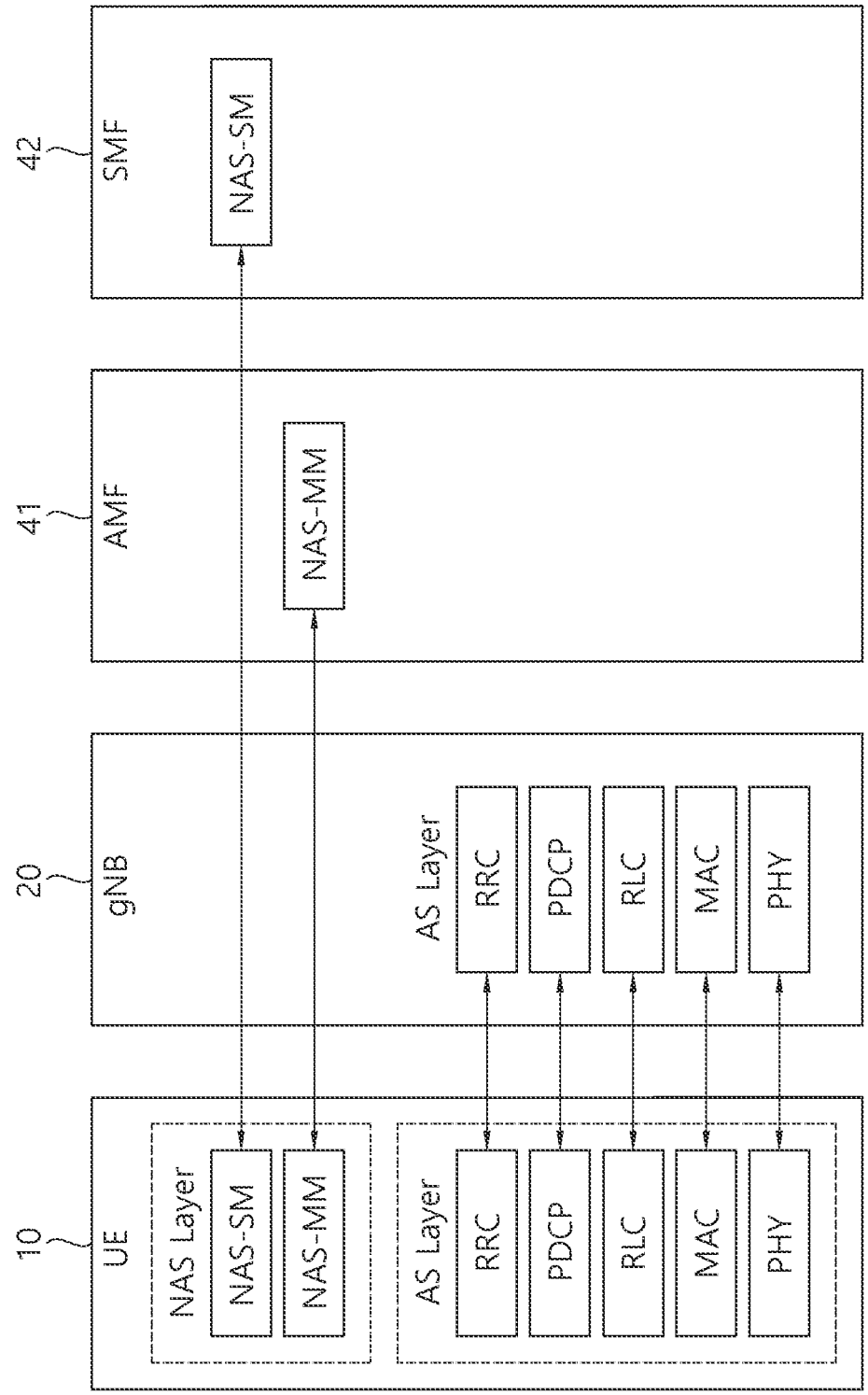
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5B:
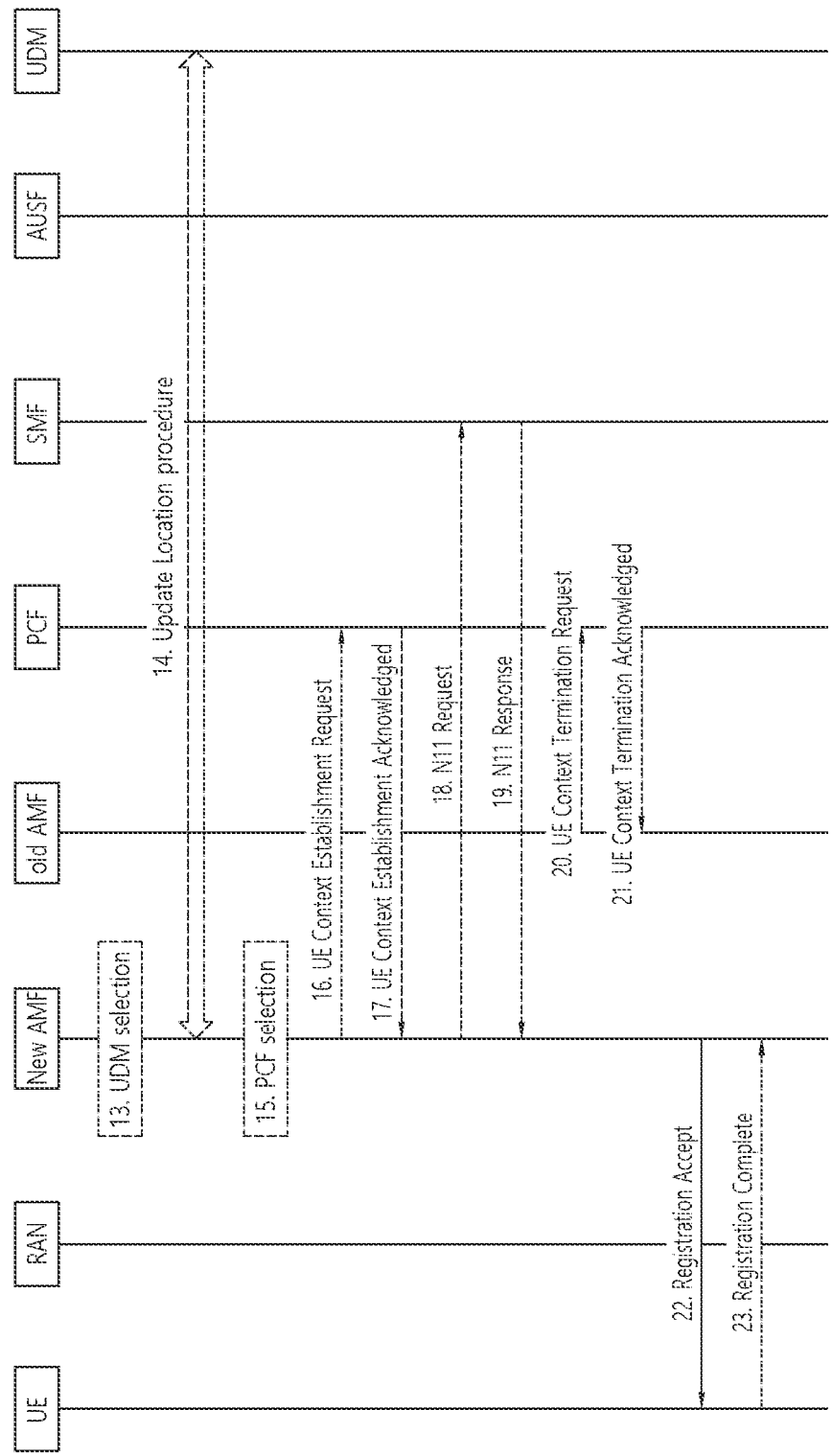

FIGS. 5a and 5b are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6B:
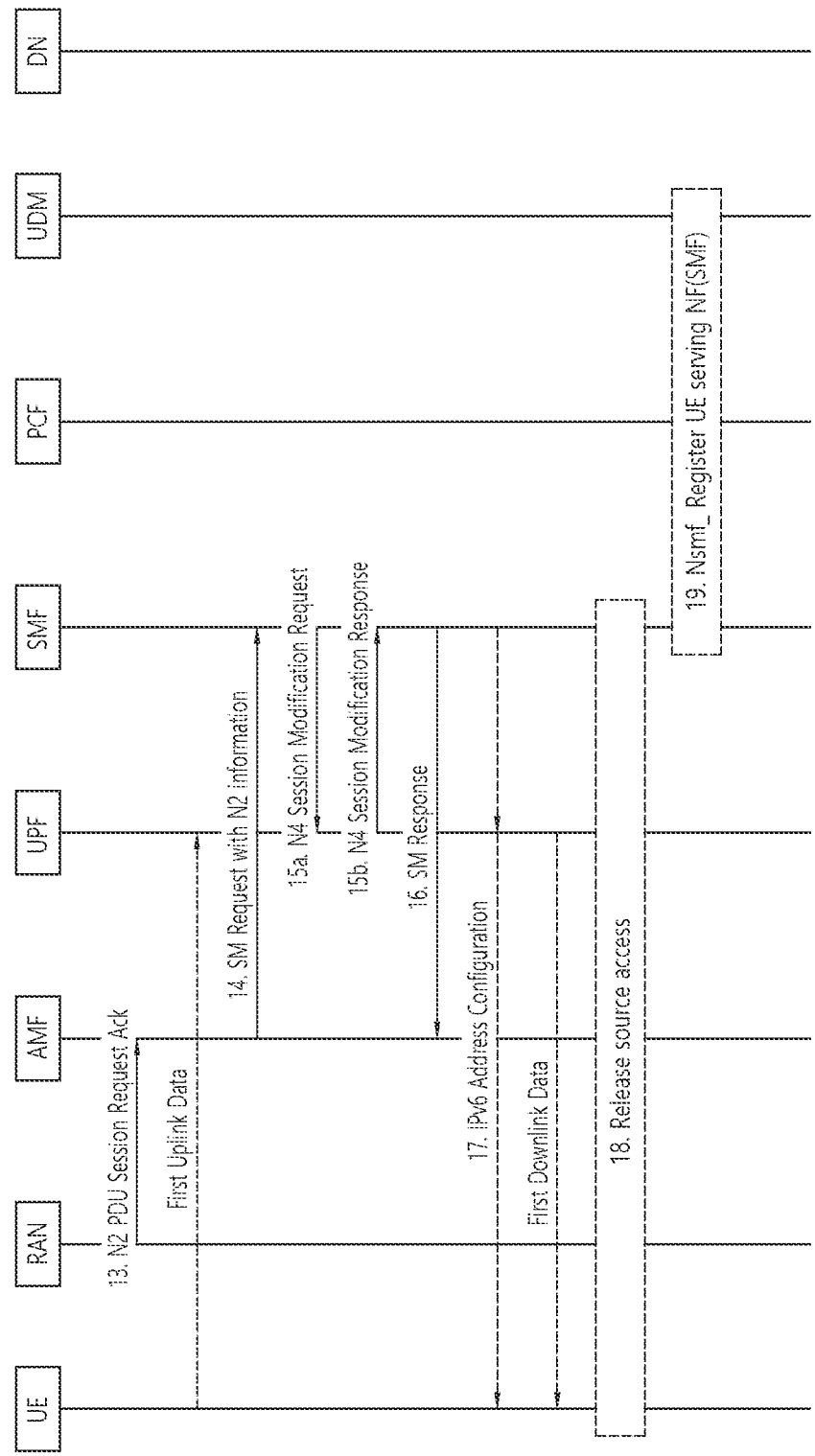

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS Flow Identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

Figure 7A:
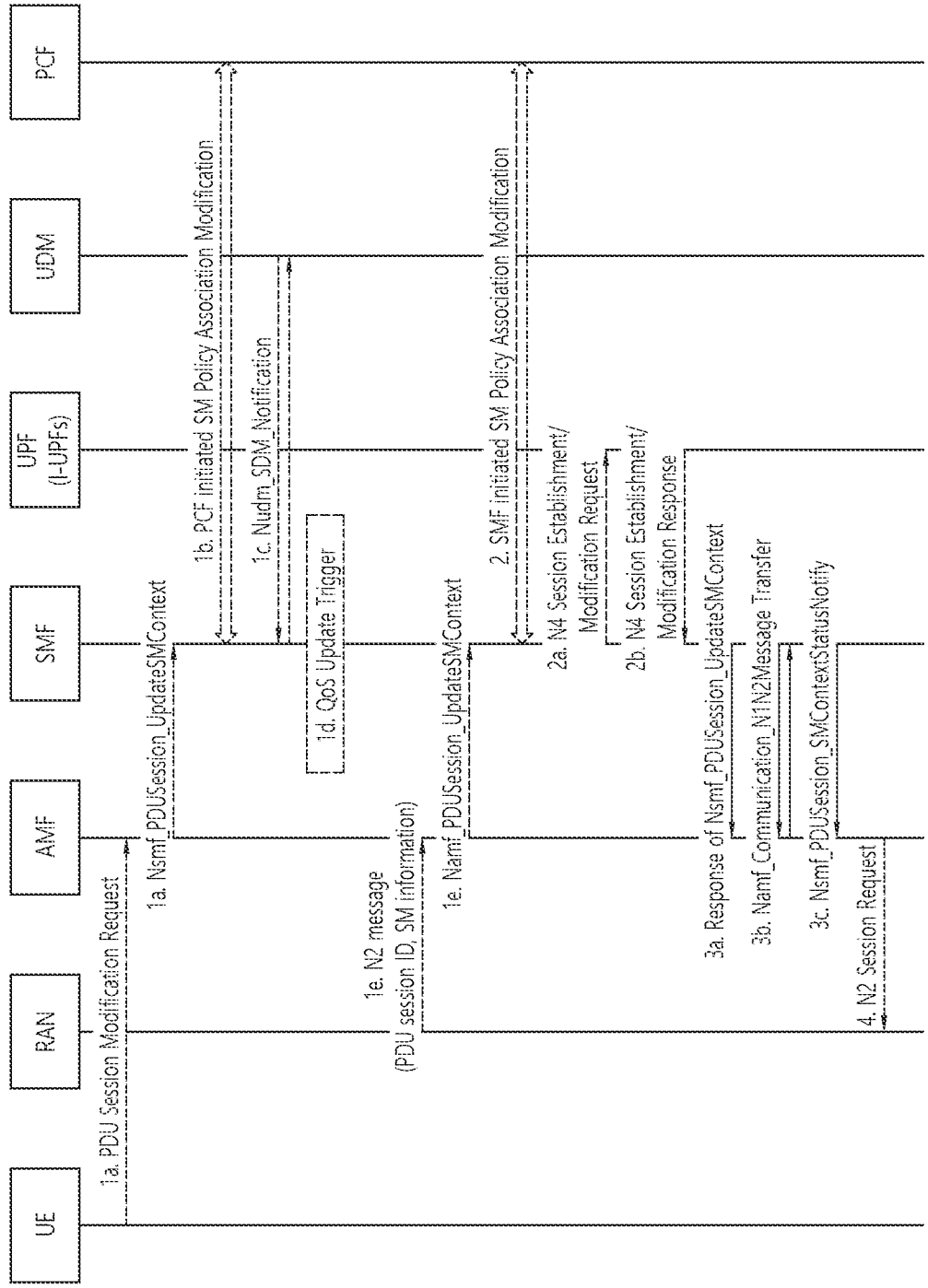

FIGS. 7a and 7b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, SGSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QFI, user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

<Non-Public Network (NPN)>

An NPN is a private network that cannot be accessed by ordinary UEs. Such an NPN may be implemented in an existing public network in two ways. One scheme is a Public Network Integrated NPN (PNI-NPN) scheme, and the other scheme is a Stand-alone NPN (S-NPN) scheme.

The first scheme, i.e., the PNI-NPN scheme, is a method of implementing a network that only a specific group of users (e.g., executives and employees of a company) can use in a general public communication network, i.e., a communication network that anyone can join if they pay money. In 5G, through network virtualization, network slicing, which physically uses the same network resources (e.g., radio frequency, wired backbone, CPU, etc.), but implements multiple separate networks through virtualization is supported. If one of several slices is allocated to a specific group and controlled to be used only by users of the specific group, this becomes PNI-NPN. That is, an NPN is implemented in a public network.

In other words, the PNI-NPN is an NPN generated using a dedicated DNN in the PLMN or using a network slice.

If the NPN is available within the PLMN, the UE may be considered to have subscribed to the corresponding PLMN.

Each cell transmits the PLMN ID of the public network. In addition, each cell transmits a Closed Access Group (CAG) ID specially allocated for the NPN, so that the NPN can be distinguished within the PLMN.

A particular group of subscribers may have access to one or more cells associated with the CAG.

CAG restricts UEs that cannot access the NPN from automatically accessing the cell.

The second scheme, i.e., the S-NPN scheme, is a scheme in which a dedicated network is separately installed for a specific group, unlike the PNI-NPN scheme. Automobile factories, for example, are completely geographically segregated. Therefore, ordinary people cannot enter the automobile factory. In addition, the number of subscribers in an automobile factory can be as large as tens of thousands. Considering this, it may be more efficient to install a dedicated base station and network resources in the factory than to implement a network by borrowing network resources of a public communication network. In this case, the S-NPN may transmit a PLMN ID exclusively assigned to the factory network from each cell, or transmit a Network Identifier (NID) code in addition to the PLMN ID, so to indicate that it is a dedicated NPN installed for a specific user group.

The CAG ID is set uniquely within the PLMN ID to distinguish CAGs.

The CAG cell broadcasts one or more CAG IDs in units of PLMNs.

In addition, the CAG cell may additionally broadcast a network name identifiable by a subscriber for each CAG identifier.

To support CAG, the UE may receive one or more of the following configuration information using a UE configuration update procedure.

- an Allowed CAG list, i.e., a list of CAG Identifiers the UE is allowed to access; and
- an indication whether the UE is only allowed to access 5GS via CAG cells Meanwhile, the following may be assumed for network and cell selection, and access control

- The CAG cell may broadcast information such that only UEs supporting CAG are accessing the cell.
- For aspects of automatic and manual network selection in relation to CAG, Mobility Restrictions information including an indication indicating an area where the movement of the UE is restricted according to the allowed CAG list, and whether the UE can access the CAG cell
- During transition from CM-IDLE to CM-CONNECTED, if the UE is accessing the 5GS via a CAG cell, the NG-RAN may provide the CAG Identifier to the AMF.
- The AMF may verify whether UE access is allowed by Mobility Restrictions information.
- If the CAG Identifier received from the NG-RAN is part of the UE's Allowed CAG list, then the AMF may accept the NAS request.
- If the CAG Identifier received from the NG-RAN is not part of the UE's Allowed CAG list, then the AMF may reject the NAS request with an appropriate cause code. The AMF may then release the NAS signaling connection for the UE by triggering the AN release procedure.
- If the UE is accessing the network via a non-CAG cell and the UE's subscription contains an indication that the UE is only allowed to access CAG cells, then the AMF may reject the NAS request with an appropriate cause code. The AMF may then release the NAS signaling connection for the UE by triggering the AN release procedure.

During connected mode mobility procedures:

Based on the Mobility Restrictions information received from the AMF,

Source NG-RAN may not handover the UE to a target NG-RAN node if the target is a CAG cell and the related CAG Identifier is not part of the UE's Allowed CAG list.

Also, Source NG-RAN may not handover the UE to a non-CAG cell if the UE is only allowed to access CAG cells;

Update of Mobility Restrictions information:

When the AMF receives the Nudm_SDM_Notification from the UDM and the AMF determines that the Allowed CAG list or the indication whether the UE is only allowed to access CAG cells have changed,

- The AMF may update the Mobility Restrictions information in the UE and NG-RAN accordingly.
- If the UE is currently accessing a CAG cell and the related CAG Identifier has been removed from the Allowed CAG list or if the UE is currently accessing a non-CAG cell and the indication that the UE is only allowed to access CAG cells has been set in the subscription, then the AMF may release the NAS signaling connection for the UE by triggering the AN release procedure.

<Problems to be Solved by the Disclosure of the Present Specification>

An example of the use of NPN is a corporate scenario. For example, company A may conduct business at several distant business sites, and may wish to provide an in-house communication network by connecting communication networks between the multiple business sites that are separated, no matter where employees access the business sites from anywhere within the business site. At the same time, it may be desired to increase the security of communication by using the communication network only by the employees of the company and preventing others from using it.

Such NPN may be implemented in a PNI-NPN scheme or an S-NPN scheme as described above.

Since S-NPN is dedicatedly installed in a region clearly separated by region and also transmits a dedicated PLMN ID, a UE subscribing to each S-NPN may find out whether the network can be accessed or not, by searching for a cell in the region in which it is located, and also by examining the network information transmitted in the cell.

On the other hand, in PNI-NPN scheme, since a general UE and a UE belonging to the NPN use the same PLMN code, another method of restricting the UE belonging to the NPN to access the PLMN only in a specific area is required. To support this, the CAG ID is used. That is, the cell belonging to the PLMN may transmit a CAG ID so that the UE subscribed to the CAG can know which CAG the cell of the corresponding PLMN supports. In addition, the UE belonging to the NPN may compare the CAG ID assigned to itself with the CAG ID transmitted in each cell, and can know whether or not it can receive the corresponding CAG service from the cell.

In addition, to each UE, the network additionally informs whether the UE can, for the corresponding CAG ID, access all cells of the PLMN or can access only the cell in which the CAG ID is transmitted. Using this, if it is set that access is possible even in a cell in which the CAG ID is not transmitted, it is possible to allow the UEs to access a specific NPN nationwide.

On the other hand, if it is set that access is not possible in a cell in which the CAG ID is not transmitted, for a specific NPN, the UE can only access the cell in which the CAG ID is transmitted in the PLMN. That is, with respect to the NPN, according to the subscription contract, or according to the security setting, the range that can be accessed is limited.

By setting the CAG ID that can be used for each PLMN to the UE, even when the UE moves abroad, each UE can receive the NPN service to which it has subscribed.

However, in the above operation, when the UE does not find any PLMNs configured in advance and camps on any PLMN, and there is no contract between the corresponding PLMN and the HPLMN to which the UE has subscribed, the UE may attempt to access the corresponding PLMN that is not permitted by its HPLMN, which may cause a problem in the security of the NPN.

Also, if the UE stores CAG information for each PLMN and then powers off, a problem may occur. For example, a problem may occur, after a CAG ID is given to a specific PLMN and a UE configured to access only through the CAG cell is powered off, when the PLMN permits access from any cell by the network internally changing the policy. In this case, when the UE is powered off in a cell in which the CAG ID is not transmitted in the PLMN, since the UE has not received a new policy, the UE may determine that access to the cell in which it is located is prohibited. So, there is a problem that the connection is not performed again.

<Disclosure of the Present Specification>

The disclosures of the present specification provide methods for solving the above-described problems.

The disclosures described below in the present specification may be implemented in one or more combinations. Each of the drawings shows an embodiment of each disclosure, but the embodiments of the drawings may be implemented in combination with each other.

I. First Disclosure of the Present Specification

In order to solve the above problem, the present specification allows the network node to transmit NPN related configuration information to the UE.

Figure 8:
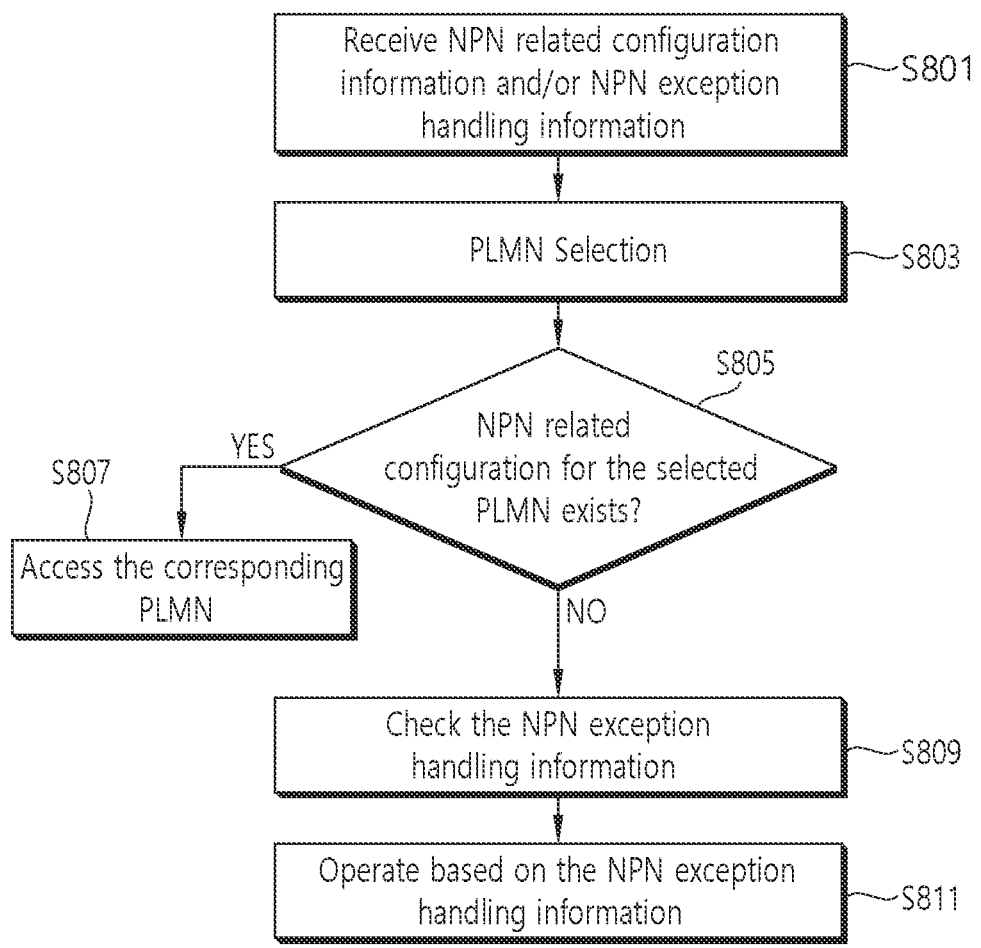
FIG. 8 is an exemplary diagram illustrating an operation according to the first disclosure of the present specification.

FIG. 8 is an exemplary diagram illustrating an operation according to the first disclosure of the present specification.

Referring to FIG. 8, the UE may receive NPN-related configuration information (i.e., PLMN specific NPN configuration information) corresponding to each PLMN from the network node (S801). In addition, the UE may receive additionally, from the network node for any PLMN, information (e.g., NPN exception handling information: Configuration Information for outside NPN) about an operation to be performed by the UE when there is no NPN-related configuration information corresponding to the PLMN.

Upon receiving such NPN-related configuration information, the UE selects a random PLMN (S803), and when there is NPN-related configuration information for the corresponding PLMN (S805), the UE performs an operation, such as accessing the corresponding PLMN, etc., by using the NPN-related configuration information (S807).

If, after selecting a random PLMN (S803), when there is no NPN-related configuration information for the corresponding PLMN (S805), the UE may check whether the NPN exception handling information is stored (S809).

If the NPN exception handling information exists, the UE may perform an operation in the corresponding PLMN according to the method indicated by the information (S811), or may select another cell or another PLMN.

For example, the NPN exception handling information may include the following information.

TABLE 3

A) Information on whether the UE can access a cell other than a cell supporting NPN
B) Information on whether the UE can camp on or register in a PLMN that does not have NPN configuration information for each PLMN
C) Information on PLMNs to which the UE can attempt access even if NPN support information is not transmitted
D) Information on PLMNs to which the UE cannot attempt to access if NPN support information is not transmitted
E) Information on PLMNs for which access is permitted or not, regardless of whether NPN support information is transmitted or not If the UE that has selected a random PLMN is subscribed to the NPN service and stores NPN configuration information, but there is no NPN configuration information for each PLMN for the currently selected PLMN, the UE may operate according to the previously received NPN exception handling information. have. For example, according to the information listed in the table above, upon receiving each piece of information, the UE may operate as follows.

I-1. Operation based on Information A

In the table above, information A (i.e., information on whether the UE can access a cell other than a cell supporting NPN) is information on, if the UE selects a PLMN without NPN configuration information for each PLMN, whether the UE can attempt access through the corresponding cell only when the cell selected in the corresponding PLMN will support NPN, or whether the UE can attempt access through another cell that does not support NPN.

For example, if it is configured that access cannot be attempted according to the information A, If the UE has selected PLMN A and does not have NPN configuration information for the corresponding PLMN A, And, if the cell of PLMN A selected by the UE informs that it does not support NPN, The UE may not attempt to register with the PLMN A.

Alternatively, the UE may try to search for another PLMN and select another PLMN.

If the search for another PLMN fails, the UE continues to stay in PLMN A and enters a limited service mode.

For example, if it is configured that access can be attempted according to the information A, If the UE has selected PLMN A and does not have NPN configuration information for the corresponding PLMN A, The UE may register for the PLMN A.

When the UE attempts to access, the network node of the PLMN A informs the access of the UE to the HPLMN to which the UE has subscribed. Through this, the HPLMN may update the configuration for the UE.

I-2. Operation based on Information B

The information B (i.e., information on whether the UE can camp on or register in a PLMN that does not have NPN configuration information for each PLMN) is information on whether or not the UE can attempt access in the corresponding PLMN when the UE selects a PLMN without NPN configuration information for each PLMN.

For example, if it is configured in the information B that the UE cannot attempt access, If the UE has selected PLMN A and does not have NPN configuration information for the corresponding PLMN A, The UE may not attempt to register for the corresponding PLMN.

Alternatively, the UE tries to search for another PLMN and tries to select another PLMN If the search for another PLMN fails, the UE continues to stay in PLMN A and enters a limited service mode.

For example, if it is configured in the information B that the UE can attempt access, If the UE has selected PLMN A and does not have NPN configuration information for the corresponding PLMN A, The UE may attempt to register with the corresponding PLMN.

When the UE attempts to access, the PLMN A informs the access of the UE to the HPLMN to which the UE has subscribed. Through this, the HPLMN may update the configuration for the UE.

An example of the above operation will be described as follows.

Figure 9:
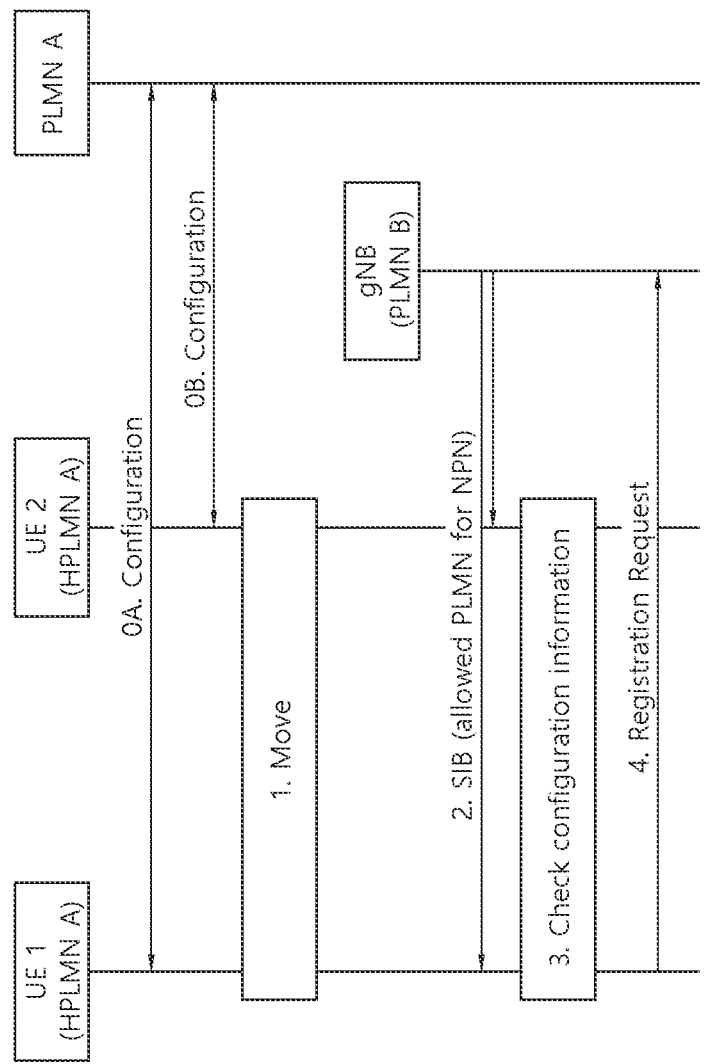
FIG. 9 is an exemplary diagram illustrating an exemplary operation.

FIG. 9 is an exemplary diagram illustrating an exemplary operation.

0A) UE 1 subscribed to PLMN A is provided with configurations related to NPN and the like within the area of PLMN A. Here, UE 1 is configured to be able to access PLMN B when the PLMN B allows access of a UE without NPN information.

0B) UE 2 subscribed to PLMN A is provided with configurations related to NPN and the like within the area of PLMN A. Here, UE 2 is configured to not be able to access PLMN B, even if the PLMN B allows access of a UE without NPN information.

1) UE 1/UE 2 moves out of the area of the PLMN to which it is subscribed, and moves into the area of the gNB of PLMN B.

2) UE 1/UE 2 receives the following information transmitted from the cell on which it camps.

Information on whether a particular NPN is supported or not

For NPN provided by PLMN B, information on whether UE without subscription information can attempt access 3) UE1/UE2 checks the information transmitted from the SIB and its own configuration information. Since both UE 1 and UE 2 do not have NPN configuration information for PLMN B, UE 1 and UE 2 check information, transmitted by the corresponding gNB, related to whether a UE without subscription information can attempt access. According to the above information, UE 1 determines that access to PLMN B is permitted based on the information it has previously received from PLMN A, and UE 2 determines that access to PLMN B is not permitted based on the information it has previously received from PLMN A.

4) According to the determination in 3, UE 1 attempts a registration request procedure, and UE 2 does not perform the registration request procedure.

Meanwhile, the information listed in Table 3 will be described again.

I-3. Operation based on Information C

The information C (i.e., information on PLMNs to which the UE can attempt access even if NPN support information is not transmitted) is information on whether or not the UE can attempt access in a cell belonging to the corresponding PLMN when the UE selects a PLMN without NPN configuration information for each PLMN.

For example, if the UE subscribed to or configured for the NPN service has selected PLMN A, and the UE does not have NPN configuration information for the PLMN A, i) And, if the cell of PLMN A selected by the UE does not transmit information that supports NPN, i-1) And, if the information C (i.e., information on PLMNs to which the UE can attempt access even if NPN support information is not transmitted) does not include the identifier of PLMN A, the UE does not attempt to register for the corresponding PLMN A.

Alternatively, the UE attempts to search for another PLMN and tries to select another PLMN.

If the search for another PLMN fails, the UE continues to stay in PLMN A and enters a limited service mode.

i-2) And, if the information C (i.e., information on PLMNs to which the UE can attempt access even if NPN support information is not transmitted) includes the identifier of PLMN A, the UE may register for the corresponding PLMN A.

When the UE attempts to access, the PLMN A informs the access of the UE to the HPLMN to which the UE has subscribed. Through this, the HPLMN may update the configuration for the UE.

ii) And, if the cell of PLMN A selected by the UE transmits information that supports NPN, The UE may attempt to access the corresponding PLMN.

When the UE attempts to access, the PLMN A informs the access of the UE to the HPLMN to which the UE has subscribed. Through this, the HPLMN may update the configuration for the UE.

I-4. Operation based on Information D

The information D (i.e., information on PLMNs to which the UE cannot attempt to access if NPN support information is not transmitted) is information on whether or not the UE can attempt access in a cell belonging to the corresponding PLMN when the UE selects a PLMN without NPN configuration information for each PLMN.

For example, if the UE subscribed to or configured for the NPN service has selected PLMN A, and the UE does not have NPN configuration information for the PLMN A, i) And, if the cell of PLMN A selected by the UE the UE does not transmit information that supports NPN, i-1) And, if the information D (i.e., information on PLMNs to which the UE cannot attempt to access if NPN support information is not transmitted) includes the identifier of PLMN A, The UE may not attempt to register with the corresponding PLMN A.

Alternatively, the UE may try to search for another PLMN and select another PLMN.

If the search for another PLMN fails, the UE continues to stay in PLMN A and enters a limited service mode.

i-2) And, if the information D (i.e., information on PLMNs to which the UE cannot attempt to access if NPN support information is not transmitted) does not include the identifier of PLMN A, The UE may register for the corresponding PLMN A.

When the UE attempts to access, the PLMN A informs the access of the UE to the HPLMN to which the UE has subscribed. Through this, the HPLMN may update the configuration for the UE.

ii) And, if the cell of PLMN A selected by the UE the UE transmits information that supports NPN, In this case, the UE may attempt to access the corresponding PLMN.

When the UE attempts to access, the PLMN A informs the access of the UE to the HPLMN to which the UE has subscribed to. Through this, the HPLMN may update the configuration for the UE.

I-5. Operation based on Information E

The information E (i.e., information on PLMNs for which access is permitted or not, regardless of whether NPN support information is transmitted or not) is information on which PLMNs the UE can attempt access to and which other PLMNs the UE cannot access, regardless of whether information on whether the cell of the corresponding PLMN supports NPN is transmitted or not.

For example, if the HPLMN allows the UE to access PLMN A/B, and when the UE searches for and finds PLMN A or PLMN B, the UE may access PLMN A or PLMN B. However, when PLMN C is found, and if the PLMN C is not included in the allowed PLMN or is included in the prohibited PLMN, the UE does not attempt to access the corresponding PLMN.

The information may be transmitted together. In this case, the UE operates with the combination of the above information.

In the above process, the cell indicating whether NPN is supported or not means that the cell transmits a CAG ID or transmits an NPN ID.

Up to now, it has been described that the UE receives NPN-related operation information for a specific PLMN in advance, and operates based on the information.

However, when the number of UEs subscribing to NPN increases and the UEs subscribing to NPN move to other countries in many cases, transmitting the NPN configuration information to the UE one by one causes a problem in that the signaling load of the network increases.

II. Second Disclosure of the Present Specification

In order to solve this problem, the second disclosure of the present specification proposes that the network node transmits to the UE information about a condition to which the UE can access. Then, after performing the check, the UE may attempt access only when its own access is allowed.

For example, each network node may deliver the following information to the UE.

Information on PLMN for NPN UEs allowed to access

Information on whether access of NPN UEs is allowed, etc.

The information about the condition to which the UE can access may be received per PLMN or per NPN. In other words, the NPN configuration information for each PLMN may include information about the condition to which the UE can access.

The above described information may be transmitted using SIB or the like.

Specifically, the SIB may be SIB1. The SIB1 may include cell access related information (e.g., CellAccessRelatedInfo) field.

TABLE 4

CellAccessRelatedInfo Field

| | |
|---|---|
| cellReservedForOtherUse | This field indicates whether the cell is reserved for other purposes. |
| PLMN-IdentityInfoList | This field may include a set of multiple PLMN-IdentityInfoLists. Each set includes a list of one or more PLMN identifiers and information related to that PLMN. |

The PLMN-IdentityInfoList may include the following fields.

TABLE 5

PLMN-IdentityInfoList Field

| | |
|---|---|
| PLMN-IdentityList | This field contains a list of PLMN IDs. |
| trackingAreaCode | Indicates the tracking area code to which the cell belonging to the CellIdentity field belongs. |
| cellReservedForOperatorUse | This field indicates whether the cell is reserved for other purposes. |
| CellIdentity | This field indicates the cell identifier. |

For example, the information on PLMN for NPN UEs allowed to access and the information on whether access of NPN UEs is allowed may be added to the PLMN-IdentityInfoList field. For example, the PLMN-IdentityList field may exist for each NPN. Specifically, a PLMN-IdentityList field may exist for NPN 1, and a PLMN-IdentityList field may exist for NPN 2 as well. Alternatively, the PLMN-IdentityList field may be applied only when an NPN UE access is allowed.

Alternatively, the information on PLMN for NPN UEs allowed to access and the information on whether access of NPN UEs is allowed may be added as a separate field in the CellAccessRelatedInfo field. For example, the CellAccessRelatedInfo field shown in Table 4 may include a list of NPNs. Each list of NPNs added in the CellAccessRelatedInfo field may include a PLMN-IdentityInfoList.

In addition to the described method, the information may be included in SIB1 in various ways.

An example of UE operation according to the above information is as follows.

If the cell of PLMN A informs that it supports NPN UE (e.g., transmits NPN ID or CAG ID, etc.), and additionally transmits PLMN IDs that are allowed access, If the UE is subscribed to the NPN and does not have NPN configuration information for the corresponding PLMN A, and if its own HPLMN ID is included in the PLMN IDs, the UE may access the PLMN/cell.

However, if the UE is subscribed to NPN and does not have NPN configuration information for the corresponding PLMN A, and if its own HPLMN ID is not included in the PLMN IDs, the UE may not try to access the PLMN/cell.

The following is a specific example of the above-described operation.

Figure 10:
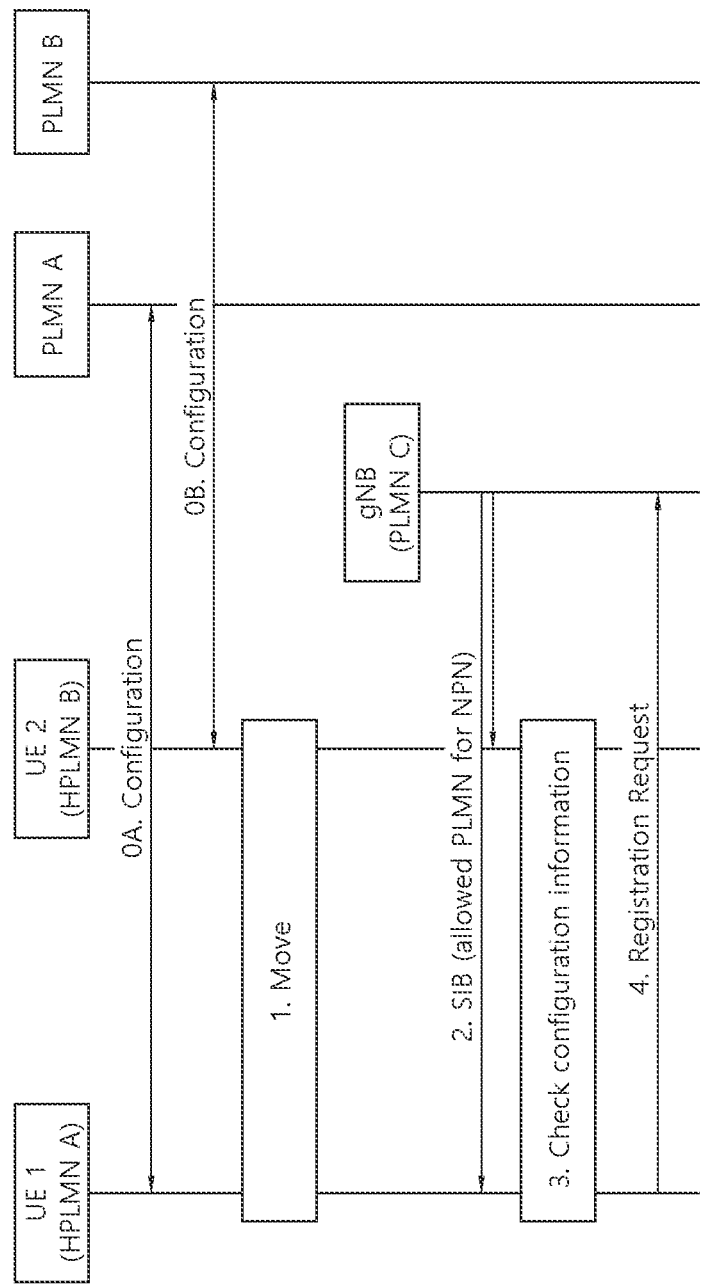
FIG. 10 is an exemplary diagram illustrating an operation according to the second disclosure of the present specification.

FIG. 10 is an exemplary diagram illustrating an operation according to the second disclosure of the present specification.

0A) UE 1 subscribed to PLMN A is provided with configurations related to NPN and the like within the area of PLMN A. Here, it is assumed that UE 1 is not provided with a configuration that it can use for PLMN C.

0B) UE 2 subscribed to PLMN B is provided with configurations related to NPN and the like within the area of PLMN B. Here, it is assumed that UE 2 is not provided with a configuration that it can use for PLMN C.

1) UE 1/UE 2 moves out of the area of the PLMN to which it is subscribed, and moves into the area of the gNB of PLMN C.

2) UE 1/UE 2 receives the following information in the cell on which it camps within PLMN C.

Information on whether NPN is supported

For NPN provided by PLMN C, information on whether a UE without subscription information can attempt access, and For the NPN provided by PLMN C, if a UE without subscription information can attempt to access, information on whether there is a restriction on the PLMN to which the UE belongs (in this example, it is assumed that only the UE of PLMN A can access PLMN C without NPN information).

The above information may be received through the SIB. The SIB may include the fields shown in Tables 4 and 5 as described above.

3) UE 1/UE 2 checks information received through the SIB and its own configuration information. Since both UE 1 and UE 2 do not have NPN configuration information for PLMN C, UE 1 and UE 2 check information, transmitted by the corresponding gNB, related to whether the UE without subscription information can attempt access. According to the information, UE 1 determines that access is allowed because it belongs to PLMN A, and UE 2 considers that it cannot attempt access PLMN C because it belongs to PLMN B.

4) According to the determination in 3, UE 1 attempts a registration operation, and UE 2 does not attempt a registration operation.

On the other hand, if the cell of PLMN A informs that NPN UE is supported, and additionally, when information on the operation of UEs with other identifiers is additionally transmitted in addition to the NPN identifier (NPN ID or CAG ID) transmitted in the corresponding cell, or when information on the operation of UEs without an NPN identifier configured to be used for the corresponding PLMN A is transmitted, And if the information on the operation of the UE is access prohibition And if the UE is configured to use NPN, if there is no NPN configuration information for each PLMN for the corresponding PLMN A, or if it is not assigned to the NPN identifier transmitted from the corresponding cell, The UE may not attempt to access the corresponding PLMN A or a cell within the corresponding PLMN A.

However, if the information on the operation of the UEs is not the access prohibition, In addition, if the UE is configured to use NPN, if there is no NPN configuration information for each PLMN for the corresponding PLMN A, or if it is not assigned to the NPN identifier transmitted from the cell, The UE may attempt to access the corresponding PLMN A or a cell within the corresponding PLMN A.

If the conditions and determination conditions of the UE described above are similar, they can be applied interchangeably. For example, a case in which there is no NPN identifier corresponding to a specific PLMN and a case in which there is an NPN identifier corresponding to a specific PLMN but the corresponding NPN identifier does not match the NPN identifier transmitted from the corresponding cell may be treated as a similar case.

Meanwhile, the NPN configuration information for each PLMN may include the following information.

Valid time of NPN configuration information for each PLMN: The information indicates how long the NPN configuration information for each PLMN is valid for the UE. If the information is expressed as an absolute time value, when the time has elapsed, or if the information is expressed as a timer value, when the timer corresponding to the time expires, the UE may determine, for the corresponding PLMN, that the stored corresponding NPN configuration information is no longer valid, or no longer stores the corresponding information.

For example, when the UE receives CAG Information for PLMN A from a network node with valid time information, For example, if the valid time information is timer information, the UE may start the timer from the time point when the CAG information is received.

If the timer expires, the UE deletes the CAG information.

Specifically, when the UE subscribes to the NPN, when the time during which it cannot access a cell related to the NPN exceeds a predetermined time, the UE may recognize that there is a problem in its NPN configuration.

The network node may inform the UE of this specific time information.

Upon recognizing that there is such a problem, the UE may access a random network and request the network to transmit configuration information. The network node receiving this may transmit new configuration information to the UE.

Upon recognizing that there is such a problem, the UE may determine that the NPN configuration information stored therein is no longer valid.

On the other hand, if the UE, which subscribes to the NPN or has NPN configuration information, no longer has NPN-related configuration information or has no NPN configuration information, the UE may access the network.

In this process, the UE transmits information that there is no NPN configuration information to the network node. The information may be transmitted by being included in a registration request message or the like.

Upon receiving this, the network transmits new NPN configuration information to the UE.

Upon receiving the information, the UE may store the information and then use it for PLMN selection or NPN-related operations.

In this process, the UE may perform access only in a cell or network supporting NPN.

If the UE is powered off or the USIM inserted in the UE is removed or replaced, the stored NPN-related information may be deleted.

For example, the UE may delete information related to the current PLMN.

Alternatively, the UE may delete information related to the restriction that access should be made only to the CAG cell.

The following contents may be added to the NPN configuration information for each PLMN of the UE.

For example, information on whether the UE can access only a cell in which NPN information (e.g., CAG ID) to which the UE is subscribed or allocated is supported Based on this, if a cell in any PLMN supports NPN, but the cell does not transmit the CAG ID assigned to the UE, If the UE is configured to access only in the cell indicating the CAG ID assigned to it, The UE may not attempt to access the cell.

However, if the UE is not configured to access only in the cell indicating the CAG ID assigned to it, The UE may attempt to access the cell.

Additionally, in the above-described process, when the UE performs an RRC connection request, a NAS-based procedure, such as a registration request procedure, or a PDU session-related procedure, such as a PDU session-related signaling transmission procedure, the UE may include in the related RRC message or NAS message information indicating that the UE is performing the corresponding procedure due to an NPN-related operation or an NPN-related registration/PDU session establishment operation. For example, the NPN may be indicated in the RRC establishment cause field in the RRC request message, and information indicating the NPN-related connection may be included in a NAS-based message such as a NAS request message.

Accordingly, the procedure shown in FIG. 9 may be modified as shown in FIG. 10.

Figure 11:
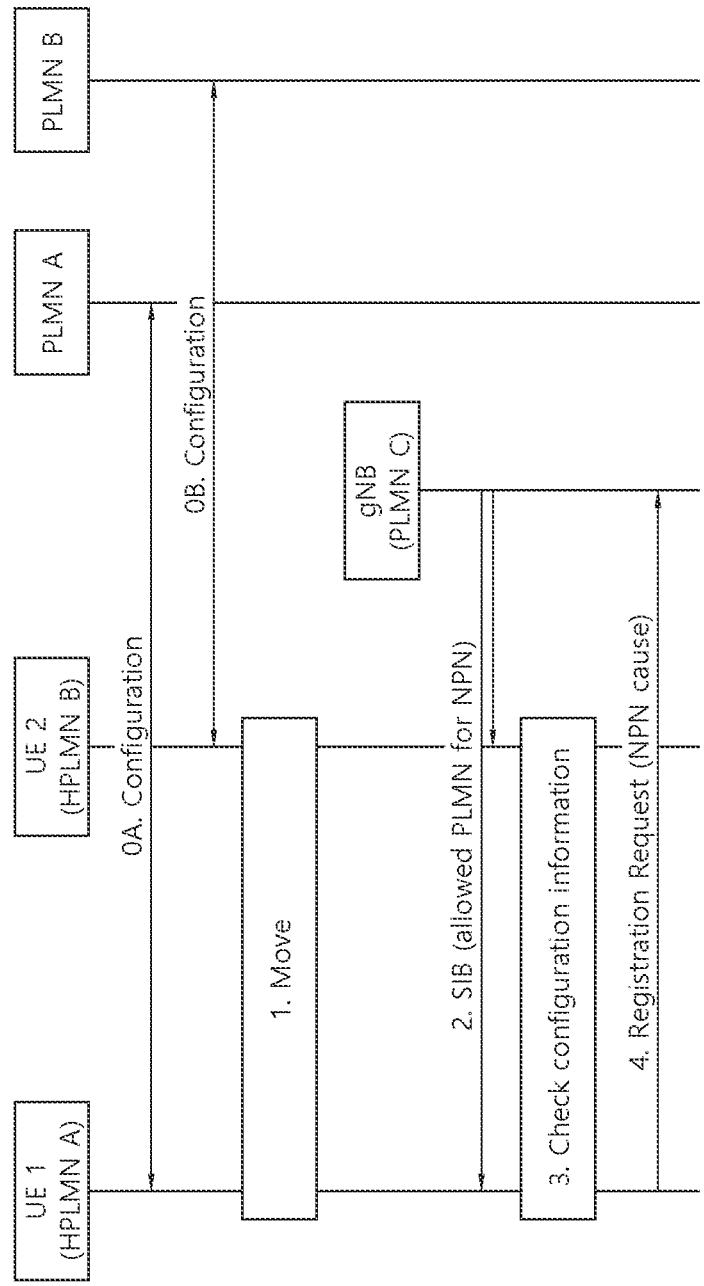
FIG. 11 is an exemplary view illustrating a modified example of FIG. 10.

FIG. 11 is an exemplary view illustrating a modified example of FIG. 10.

Among the procedures shown in FIG. 11, a procedure different from that of FIG. 10 is procedure 4, so only this will be described as follows.

4) UE 1 transmits a registration request message for registration, and UE 2 does not transmit a registration request message. In this process, UE 1 may include in the registration request message information indicating that there is no configuration information/subscription information for an NPN supported in the corresponding cell or that there is no NPN subscription information/configuration information for the corresponding PLMN. Then, the base station of PLMN C may additionally provide configuration information for the corresponding UE.

Hereinafter, an apparatus to which the above disclosure of the present specification can be applied will be described.

Figure 12:
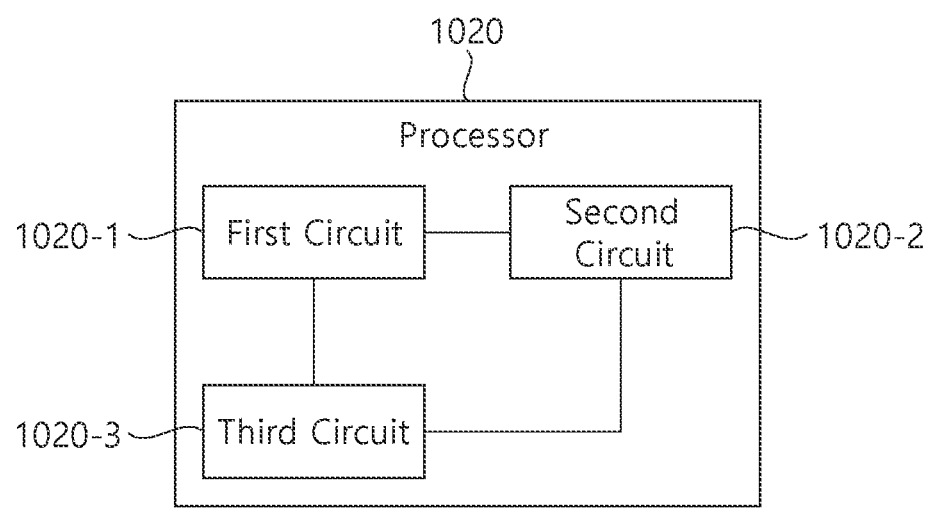
FIG. 12 shows a block diagram of a processor in which the disclosure of the present specification is implemented.

FIG. 12 shows a block diagram of a processor in which the disclosure of the present specification is implemented.

As can be seen with reference to FIG. 12, a processor 1020 in which the disclosure of the present specification is implemented includes a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU). can do.

The processor may be included in the UE.

The first circuit 1020-1 of the processor may select a first Public Land Mobile Network (PLMN).

When it is configured to use NPN, the second circuit 1020-2 of the processor may determine whether NPN is available in the first cell of the first PLMN based on NPN-related configuration information.

If it is determined that the NPN is available in the first cell of the first PLMN, the third circuit 1020-3 of the processor may attempt to access the first cell in the first PLMN. Alternatively, if it is determined that the NPN is unavailable in the first cell of the first PLMN, the third circuit 1020-3 of the processor may not attempt to access the first cell in the first PLMN.

The processor may further include a fourth circuit (not shown) for receiving the NPN-related configuration information and the PLMN information together through a transceiver to be described later.

The fourth circuit may receive the NPN-related configuration information for each PLMN.

The processor may further include a fifth circuit (not shown) for receiving NPN exception handling information through a transceiver to be described later. The NPN exception handling information may indicate information on an operation to be performed by the UE when there is no NPN-related configuration information corresponding to any PLMN.

The NPN exception handling information may include one or more of: information on whether the UE can access a cell other than a cell supporting NPN, information on whether the UE can camp on or register in a PLMN without NPN configuration information for each PLMN, information on PLMNs to which the UE can attempt access even if NPN-related information is not transmitted, information on PLMNs to which UE cannot attempt to access if NPN-related information is not transmitted, and information on PLMNs for which access is permitted or not, regardless of whether NPN-related information is transmitted or not.

The processor may further include a sixth circuit (not shown) for receiving, from the first cell of the first PLMN, at least one of first information related to the NPN and second information about an operation of the UE without configuration information for NPNs supported by the first cell of the first PLMN through a transceiver to be described later At least one of the first information and the second information may be received through a System Information Block (SIB).

When the NPN-related configuration information is not configured for the first PLMN, or when the NPN configured to be used by the UE is not included in the NPNs supported by the first cell of the first PLMN, and/or the second information indicates that access is prohibited for a UE that does not have configuration information for NPNs supported by the first cell of the first PLMN, the third circuit 1020-3 of the processor may not attempt to access the cell.

When the NPN-related configuration information is configured for the first PLMN, or when the NPN configured to be used by the UE is included in the NPN list supported by the first cell of the first PLMN, or the second information indicates that access is allowed for a UE that does not have configuration information for NPNs supported by the first cell of the first PLMN, the third circuit 1020-3 may attempt to access the first cell in the first PLMN.

When the third circuit 1020-3 does not attempt to access the first cell in the first PLMN, another cell or another PLMN may be selected.

Figure 13:
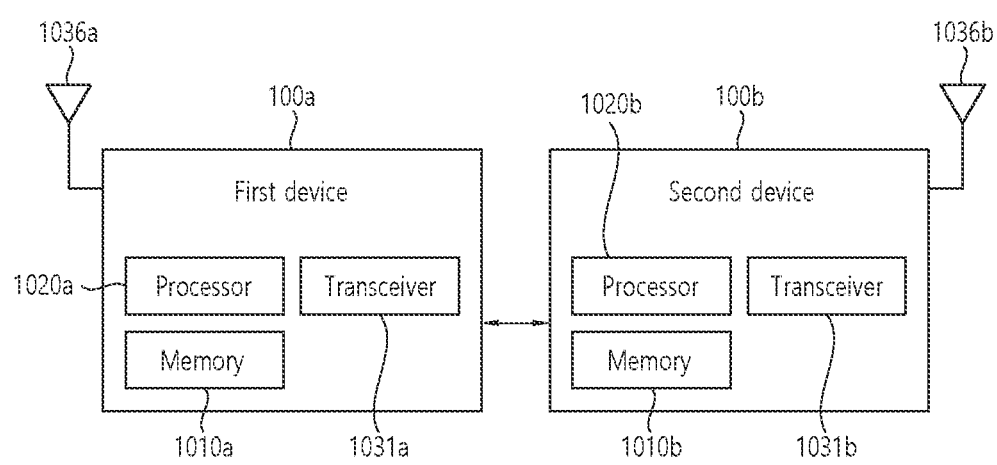
FIG. 13 illustrates a wireless communication system according to an embodiment.

FIG. 13 illustrates a wireless communication system according to an embodiment.

Referring to FIG. 13, the wireless communication system may include a first device 100*a* and a second device 100*b*.

The first device 100*a* may be a UE described in the disclosure of the present specification. Or, the first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 14:
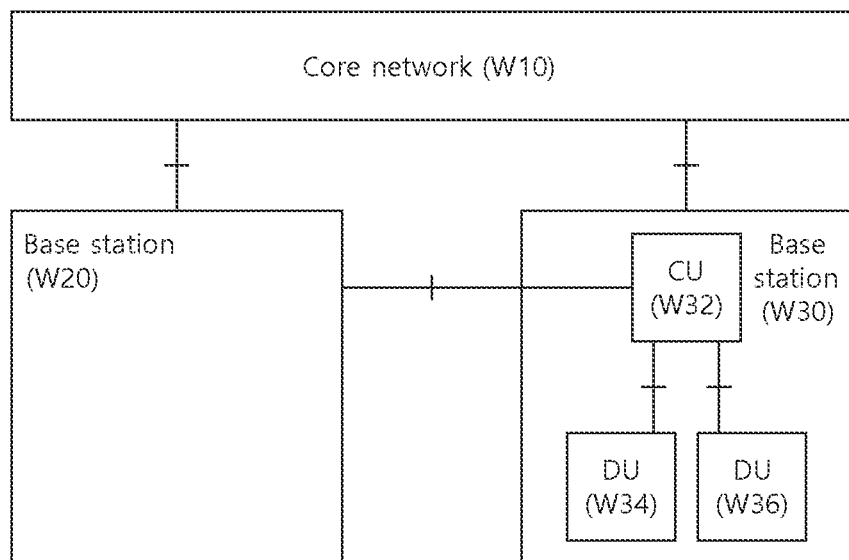
FIG. 14 illustrates a block diagram of a network node according to an embodiment.

FIG. 14 illustrates a block diagram of a network node according to an embodiment.

In particular, FIG. 14 is a diagram illustrating in detail a case in which a base station is divided into a Central Unit (CU) and a Distributed Unit (DU).

Referring to FIG. 14, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Orotocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 15:
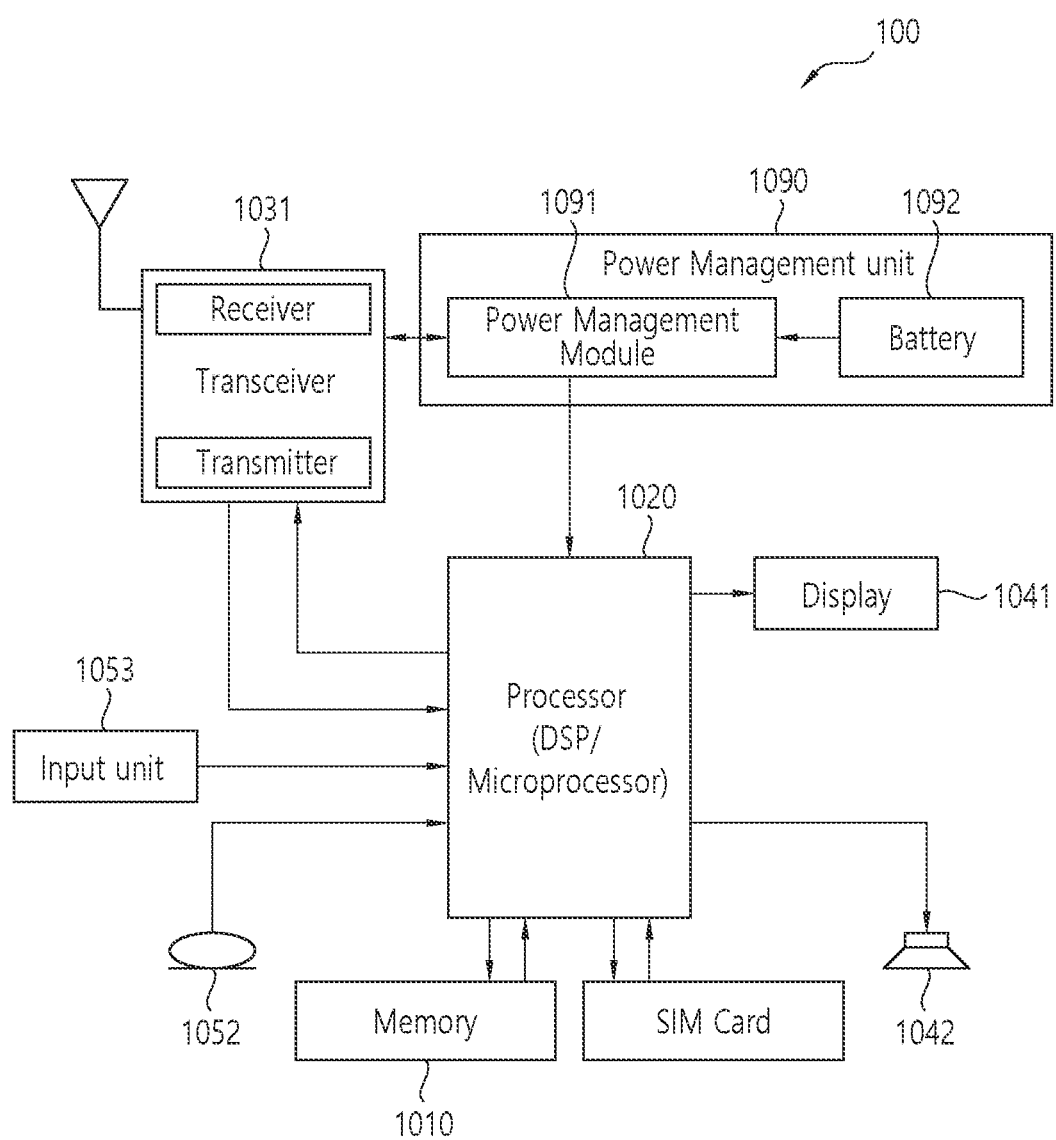
FIG. 15 is a block diagram illustrating a configuration of a UE according to an embodiment.

FIG. 15 is a block diagram illustrating a configuration of a UE according to an embodiment.

In particular, FIG. 15 is a diagram illustrating the UE of FIG. 13 above in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 16:
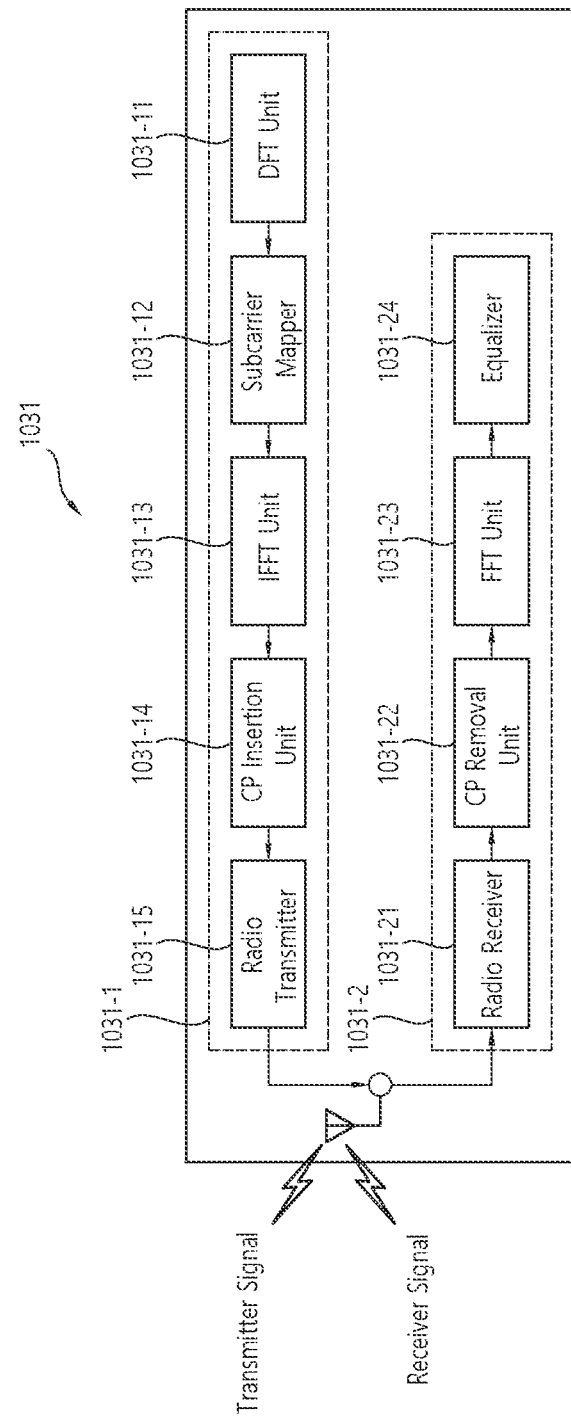
FIG. 16 is a detailed block diagram illustrating the transceiver of the first device shown in FIG. 13 or the transceiver of the device shown in FIG. 14 in detail.

FIG. 16 is a detailed block diagram illustrating the transceiver of the first device shown in FIG. 13 or the transceiver of the device shown in FIG. 14 in detail.

Referring to FIG. 16, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 17:
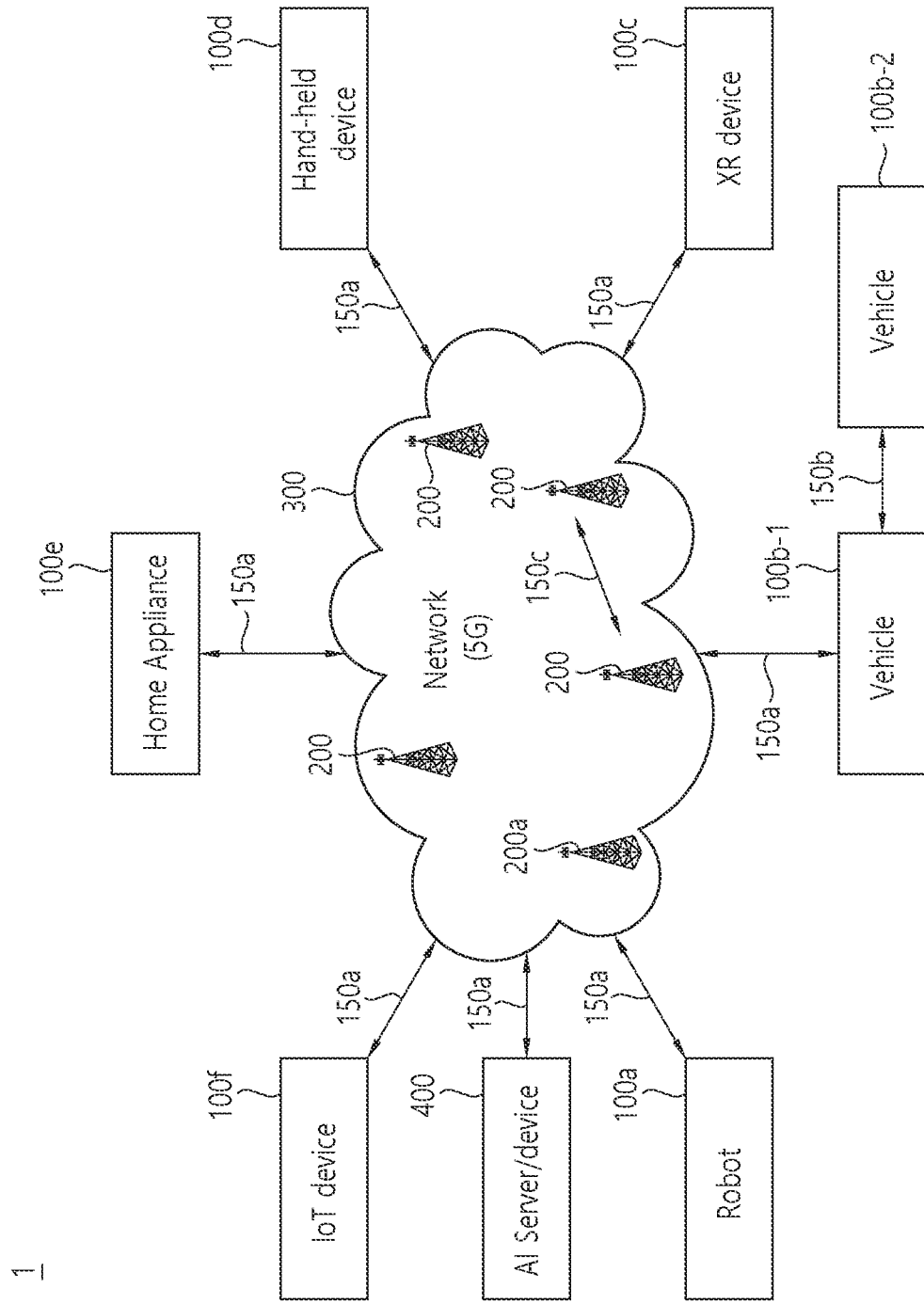
FIG. 17 illustrates a communication system 1 applied to the disclosure of the present specification.

FIG. 17 illustrates a communication system 1 applied to the disclosure of the present specification.

Referring to FIG. 17, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by a wireless device in a wireless communication system, the method comprising:
   receiving Public Land Mobile Network (PLMN) information;
   receiving Non-Public Network (NPN)-related configuration information;
   receiving NPN exception handling information,
   wherein the NPN exception handling information informs an operation to be performed for a specific PLMN in response to no NPN-related configuration information for the specific PLMN;
   selecting a PLMN;
   based on the wireless device being configured to use an NPN, determining whether NPN-related configuration information for the selected PLMN exists or not;
   i) based on the NPN-related configuration information for the selected PLMN existing, attempting access to a cell in the selected PLMN based on the NPN-related configuration information for the PLMN; and
   ii) based on the NPN-related configuration information for the selected PLMN not existing, performing the operation for the selected PLMN based on the NPN exception handling information for the selected PLMN.

2. The method of claim 1, wherein the NPN-related configuration information is received for each PLMN.

3. The method of claim 1, wherein the NPN exception handling information includes one or more of:
   information regarding whether the wireless device can access a cell other than a cell supporting NPN,
   information regarding whether the wireless device can camp on or register in a PLMN without the NPN-related configuration information for each PLMN,
   information regarding PLMNs to which the wireless device can attempt access even if the NPN-related configuration information is not transmitted;
   information regarding PLMNs to which wireless device cannot attempt to access if the NPN-related configuration information is not transmitted, and
   information regarding PLMNs for which access is permitted or not, regardless of whether the NPN-related configuration information is transmitted or not.

4. The method of claim 1, wherein the method further comprises receiving, from the cell in the selected PLMN, at least one of first information related to the NPN or second information related to an operation of the wireless device without configuration information for NPNs supported by the cell in the selected PLMN.

5. The method of claim 4, wherein at least one of first information or the second information is received through a System Information Block (SIB).

6. The method of claim 4, wherein the operation comprises not attempting to access the cell in the selected PLMN.

7. Thee method of claim 6, wherein the operation comprises selecting another cell or another PLMN based on no access attempt being made to the cell in the selected PLMN.

8. A wireless device configured to operate in a wireless communication system, the wireless device comprising:
   at least one processor;
   at least one memory operably electrically connectable to the at least one processor and storing instructions that, based on being executed by the at least one processor, perform operations comprising:
   receiving Public Land Mobile Network (PLMN) information;

receiving Non-Public Network (NPN)-related configuration information;

receiving NPN exception handling information, wherein the NPN exception handling information informs an operation to be performed for a specific PLMN in response to no NPN-related configuration information for the specific PLMN;

selecting a PLMN;

based on the wireless device being configured to use an NPN, determining whether NPN-related configuration information for the selected PLMN exists or not;

i) based on the NPN-related configuration information for the selected PLMN existing, attempting access to a cell in the selected PLMN based on the NPN-related configuration information for the selected PLMN; and ii) based on the NPN-related configuration information for the selected PLMN not existing, performing the operation for the selected PLMN based on the NPN exception handling information for the selected PLMN.

9. The wireless of claim 8, wherein the NPN-related configuration information is received for each PLMN.

10. A non-transitory computer readable storage medium storing instructions that, based on being executed by at least one processor, cause the at least one processor to perform operations comprising:

receiving Public Land Mobile Network (PLMN) information;

receiving Non-Public Network (NPN)-related configuration information;

receiving NPN exception handling information, wherein the NPN exception handling information informs an operation to be performed for a specific PLMN in response to no NPN-related configuration information for the specific PLMN;

selecting a PLMN;

based on being configured to use an NPN, determining whether NPN-related configuration information for the selected PLMN exists or not;

i) based on the NPN-related configuration information for the selected PLMN existing, attempting access to a cell in the selected PLMN; and ii) based on the NPN-related configuration information for the selected PLMN not existing, performing the operation for the selected PLMN based on the NPN exception handling information for the selected PLMN.

* * * * *